United States Patent
Huang et al.

(10) Patent No.: US 11,662,916 B2
(45) Date of Patent: May 30, 2023

(54) METHOD, ELECTRONIC DEVICE AND COMPUTER PROGRAM PRODUCT FOR MANAGING A STORAGE SYSTEM

(71) Applicant: EMC IP Holding Company LLC, Hopkinton, MA (US)

(72) Inventors: Yechen Huang, Shanghai (CN); Honggang Li, Shanghai (CN); Zhonghua Zhu, Shanghai (CN); Zhenhua Dong, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 73 days.

(21) Appl. No.: 17/517,913

(22) Filed: Nov. 3, 2021

(65) Prior Publication Data

US 2022/0334732 A1   Oct. 20, 2022

(30) Foreign Application Priority Data

Apr. 15, 2021   (CN) .................. CN202110404906

(51) Int. Cl.
*G06F 12/00* (2006.01)
*G06F 3/06* (2006.01)
*G06F 11/14* (2006.01)

(52) U.S. Cl.
CPC ............ *G06F 3/0619* (2013.01); *G06F 3/061* (2013.01); *G06F 3/0611* (2013.01); *G06F 3/0644* (2013.01); *G06F 3/0652* (2013.01); *G06F 3/0685* (2013.01); *G06F 11/1451* (2013.01)

(58) Field of Classification Search
CPC ...... G06F 3/0619; G06F 3/061; G06F 3/0611; G06F 3/0644; G06F 3/0652; G06F 3/0685; G06F 11/1451; G06F 1/31; G06F 3/0659; G06F 3/0673; G06F 11/1456; G06F 11/1417; G06F 3/0604; G06F 3/0638; G06F 3/0656
See application file for complete search history.

(56) References Cited

U.S. PATENT DOCUMENTS

| | | | | |
|---|---|---|---|---|
| 5,630,093 A | * | 5/1997 | Holzhammer | ........ G06F 3/0601 711/115 |
| 6,073,221 A | * | 6/2000 | Beal | .................... G06F 11/2082 714/E11.123 |
| 6,578,121 B1 | * | 6/2003 | Schutzman | ......... G06F 11/1458 714/E11.121 |
| 10,339,047 B2 | | 7/2019 | Kirvan et al. | |
| 2007/0011416 A1 | * | 1/2007 | Lee | ....................... G06F 3/0617 711/162 |
| 2008/0155331 A1 | | 6/2008 | Rothman et al. | |
| 2009/0198931 A1 | * | 8/2009 | Ohyama | ............... G06F 3/0689 711/E12.001 |

(Continued)

*Primary Examiner* — John A Lane
(74) *Attorney, Agent, or Firm* — BainwoodHuang

(57) ABSTRACT

Techniques for managing a storage system involve cleaning up a persistent storage disk in a backup mode to increase a writing rate of the persistent storage disk. The techniques further involve creating a library partition in the cleaned persistent storage disk. The techniques further involve writing cache data in a volatile storage device into the library partition. Accordingly, in a storage device with only a single persistent storage disk, cache data in a volatile storage device can be written into the persistent storage disk at a relatively high writing rate, thereby achieving efficient memory persistence.

15 Claims, 6 Drawing Sheets

(56) References Cited

U.S. PATENT DOCUMENTS

| | | | |
|---|---|---|---|
| 2011/0213915 A1* | 9/2011 | So | G06F 3/0679 |
| | | | 711/E12.008 |
| 2016/0077925 A1* | 3/2016 | Tekade | G06F 3/067 |
| | | | 707/654 |
| 2017/0228168 A1 | 8/2017 | Bahnsen et al. | |
| 2018/0107596 A1 | 4/2018 | Kelly et al. | |
| 2018/0307563 A1* | 10/2018 | Nguyen | G06F 11/1451 |
| 2022/0138053 A1* | 5/2022 | Barbalho | G06F 11/1469 |
| | | | 711/162 |

* cited by examiner

METHOD, ELECTRONIC DEVICE AND COMPUTER PROGRAM PRODUCT FOR MANAGING A STORAGE SYSTEM

CROSS-REFERENCE TO RELATED APPLICATION

This application claims priority to Chinese Patent Application No. CN202110404906.X, on file at the China National Intellectual Property Administration (CNIPA), having a filing date of Apr. 15, 2021 and having "METHOD, ELECTRONIC DEVICE AND COMPUTER PROGRAM PRODUCT FOR MANAGING A STORAGE SYSTEM" as a title, the contents and teachings of which are herein incorporated by reference in their entirety.

TECHNICAL FIELD

Embodiments of the present disclosure relate to the field of data storage, and in particular, to a method, an electronic device, and a computer program product for managing a storage system.

BACKGROUND

Current storage systems usually have multiple levels of storage media, for example, a main memory (also referred to as a memory) with a fast read and write speed and a small storage capacity, and an auxiliary memory (also referred to as an external memory) with a slow read and write speed and a large storage capacity. The main memory is generally a volatile storage device, e.g., a dynamic random access memory (DRAM). The auxiliary memory is generally a non-volatile storage device, e.g., a solid state drive (SSD), a mechanical hard drive (HDD), etc. When a storage system is powered off, data stored in a volatile storage device needs to be backed up to a non-volatile storage device in a timely manner to protect user data. This operation is usually referred to as Permanent Memory Persistence (PMP).

SUMMARY OF THE INVENTION

In a first aspect of the present disclosure, a method for managing a storage system is provided. The method includes cleaning up a persistent storage disk in a backup mode to increase the writing rate of the persistent storage disk. The method further includes creating a library partition in the cleaned persistent storage disk. The method further includes writing cache data in a volatile storage device into the library partition.

In a second aspect of the present disclosure, an electronic device is provided. The electronic device includes a processor and a memory that is coupled to the processor and has instructions stored therein. The instructions, when executed by the processor, cause the device to execute actions. The actions include: cleaning up a persistent storage disk in a backup mode to increase the writing rate of the persistent storage disk. The actions further include creating a library partition in the cleaned persistent storage disk. The actions further include writing cache data in a volatile storage device into the library partition.

In a third aspect of the present disclosure, a computer program product is provided. The computer program product is tangibly stored on a computer-readable medium and includes machine-executable instructions. The machine-executable instructions, when executed, cause a machine to execute the method according to the first aspect.

In an embodiment of the present disclosure, using the solution for managing a storage system of the present application and in a storage device with only a single persistent storage disk, cache data in a volatile storage device can be written into the persistent storage disk at a relatively high writing rate, thereby achieving efficient memory persistence.

The Summary of the Invention section is provided to introduce the selection of concepts in a simplified form, which will be further described in the Detailed Description below. The Summary of the Invention section is neither intended to identify key features or main features of the embodiments of the present disclosure, nor intended to limit the scope of the present disclosure.

BRIEF DESCRIPTION OF THE DRAWINGS

The above and other objectives, features, and advantages of embodiments of the present disclosure will become more apparent by describing example embodiments of the present disclosure in more detail in combination with the accompanying drawings. In the example embodiments of the present disclosure, the same reference numerals generally represent the same parts.

DETAILED DESCRIPTION

Figure 1:
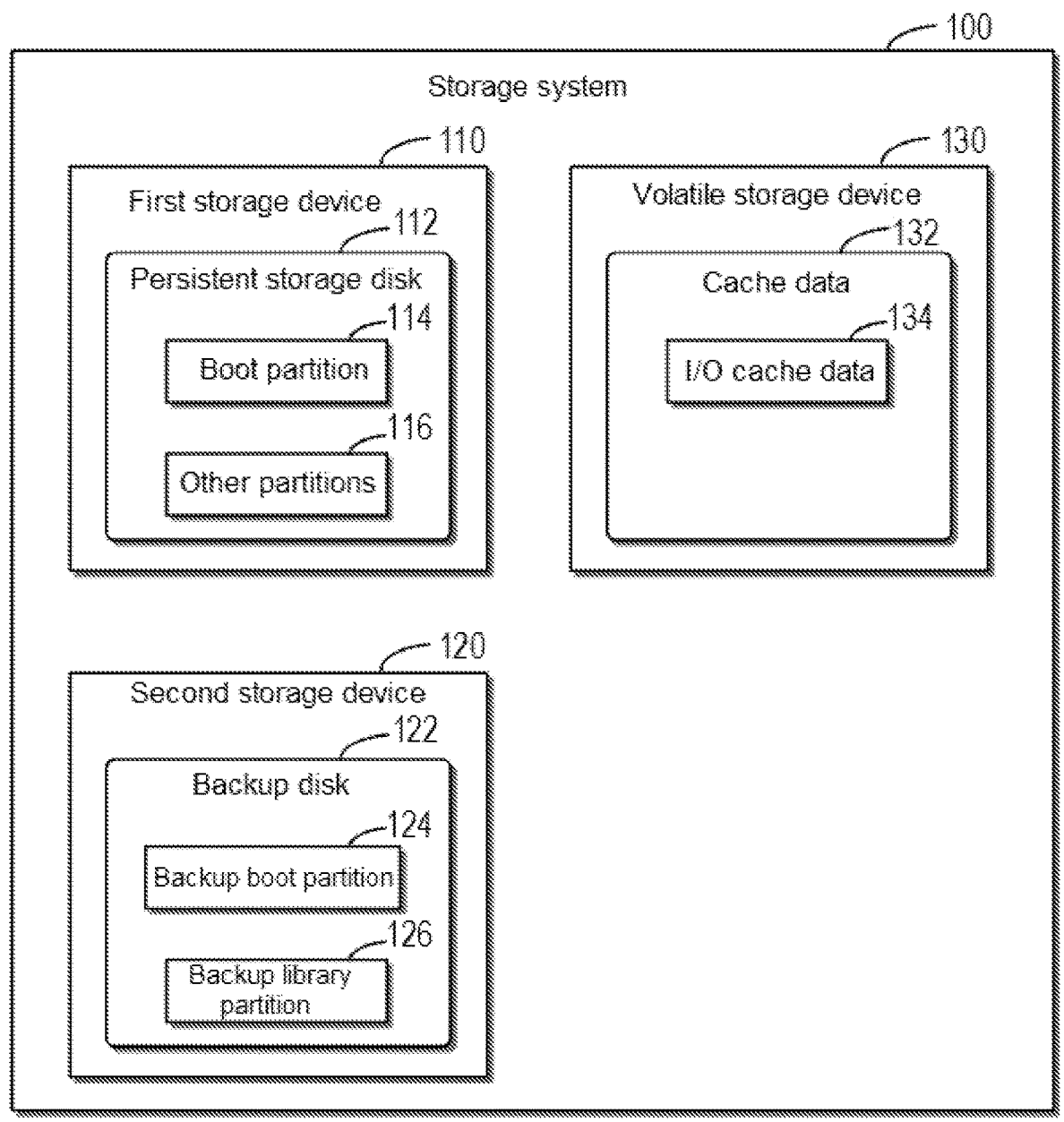
FIG. 1 shows a schematic diagram of a storage system in which an embodiment of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the embodiments of the present disclosure will be described below with reference to several example embodiments shown in the accompanying drawings. Although preferred embodiments of the present disclosure are shown in the accompanying drawings, it should be understood that these embodiments are described only to enable those skilled in the art to better understand and then implement the embodiments of the present disclosure, and are not intended to impose any limitation to the scope of the present disclosure.

The term "include" and variants thereof used herein indicate open-ended inclusion, that is, "including but not limited to." Unless specifically stated, the term "or" means "and/or." The term "based on" means "based at least in part on." The terms "an example embodiment" and "some embodiments" mean "at least one example embodiment." The term "another embodiment" means "at least one further embodiment." The terms "first," "second," and the like may refer to different or identical objects. Other explicit and implicit definitions may also be included below.

As mentioned above, data in a volatile storage device will be lost when the power is off. At present, some data recovery methods have been proposed for enterprise-level storage systems. Using these methods, a battery-powered storage system can recover at least part of data in the volatile storage device after a main power supply is disconnected. However, it is difficult for the battery-powered storage system to run for a long time. Once the battery is exhausted, these recovered data in the volatile storage device will be permanently lost. Therefore, it is necessary to store these recovered data in a non-volatile storage device in a timely manner for backup, that is, to perform PMP. In this way, even if the battery is exhausted, these data will be stored intact in the non-volatile storage device.

In order to realize effective PMP, an additional persistent storage disk is usually provided in a non-volatile storage device to be dedicated to backing up data in the volatile storage device. The persistent storage disk may be any suitable non-volatile storage disk, e.g., an SSD disk and a NAND flash disk. In the case of battery power supply, the storage system can store data that needs to be backed up in the volatile storage device to a dedicated persistent storage disk. When the main power supply is recovered, the storage system can recover the data backed up in the dedicated persistent storage disk to a volatile main memory. However, this implementation of PMP requires an additional persistent storage disk to be provided in the storage device, thereby increasing the volume of the storage device and increasing the overhead.

Another way to realize PMP is also proposed. In this solution, there is no need to provide an additional persistent storage disk in a storage device; instead, a partition is reserved in a single persistent storage disk of the storage device for backing up data in a volatile storage device. However, since only a single persistent storage disk is provided in the storage device, and the persistent storage disk is used for normal reading and writing of user data, the writing rate of the persistent storage disk lingers at a relatively low level.

It should be understood that the writing rate of the persistent storage disk gradually decreases as the number of times of writing increases. In particular, for SSD disks and NAND flash disks, for example, the writing rate will drop to a great extent as the number of times of writing increases. For example, a persistent storage disk in the factory state has the highest writing rate, while the writing rate of the persistent storage disk after multiple times of writing will linger at a relatively low level. Therefore, in this implementation of PMP, due to the relatively low writing rate of the persistent storage disk, it is difficult for the battery-powered storage system to write data in the volatile storage device into the persistent storage disk in a relatively short period of time.

According to an embodiment of the present disclosure, a persistent storage disk is cleaned up in a backup mode to increase the writing rate of a persistent storage disk. In this solution, a library partition is created in the cleaned persistent storage disk. In this solution, cache data in a volatile storage device is written into the library partition. In this way, in a storage device with only a single persistent storage disk, the data in the volatile storage device can be written into the persistent storage disk at a relatively high writing rate, thereby realizing efficient PMP.

Basic principles and several example embodiments of the present disclosure are illustrated below with reference to FIG. 1 to FIG. 5. It should be understood that these example embodiments are provided only to enable those skilled in the art to better understand and then implement the embodiments of the present disclosure, and not to limit the scope of the present disclosure in any way.

FIG. 1 shows storage system 100 in which an embodiment of the present disclosure may be implemented. As shown in FIG. 1, storage system 100 includes first storage device 110, second storage device 120, and volatile storage device 130. First storage device 110 can be used to store user data. Second storage device 120 can be used to back up user data in first storage device 110. Volatile storage device 130 can be used to store cache data 132 of an operating system or other running programs. First storage device 110 and second storage device 120 may be non-volatile storage devices. First storage device 110 and second storage device 120 may be different physical storage devices.

First storage device 110 may include a single non-volatile persistent storage disk 112. Examples of persistent storage disk 112 include an SSD disk and a NAND flash disk that use different interfaces. Preferably, persistent storage disk 112 is an embedded SSD disk. Persistent storage disk 112 may have multiple partitions, for example, may include boot partition 114. Boot partition 114 can store mirror data of a boot system. The boot system can be a dedicated operating system. Various processes, e.g., a purge process, a persistence (PMP) process, etc., can be executed by loading the boot system. Persistent storage disk 112 may also include a root partition, a firmware partition, etc. (hereinafter collectively referred to as other partitions 116). The root partition can store mirror data of an operating system of a computing device, e.g., mirror data of a Linux operating system.

Similarly, second storage device 120 may include non-volatile backup disk 122. Backup disk 122 may be any suitable non-volatile storage disk, e.g., an SSD disk, an HDD disk, etc. Backup disk 122 may include a plurality of storage disks. Since second storage device 120 is used to back up user data in first storage device 110, backup disk 122 may have backup boot partition 124 accordingly. Backup boot partition 124 can store all data of boot partition 114. Second storage device 120 may also include backup library partition 126. Backup library partition 126 may be used to store cache data to be backed up. Related details will be described in detail with reference to FIG. 3 and FIG. 4.

Volatile storage device 130 may be a volatile storage device for storing cache data 132. Examples of volatile storage device 130 may include a DRAM, a Static Random Access Memory (SRAM), and the like. Cache data 132 may include data generated during the operation of the system, e.g., input/output (I/O) cache data 134. I/O cache data 134 may be cache data that needs to be backed up to a non-volatile storage device when the main power supply is disconnected.

It should be understood that storage system 100 shown in FIG. 1 is merely an example and should not constitute any limitation to the functions and scope of the implementations described in the present disclosure.

Figure 2:
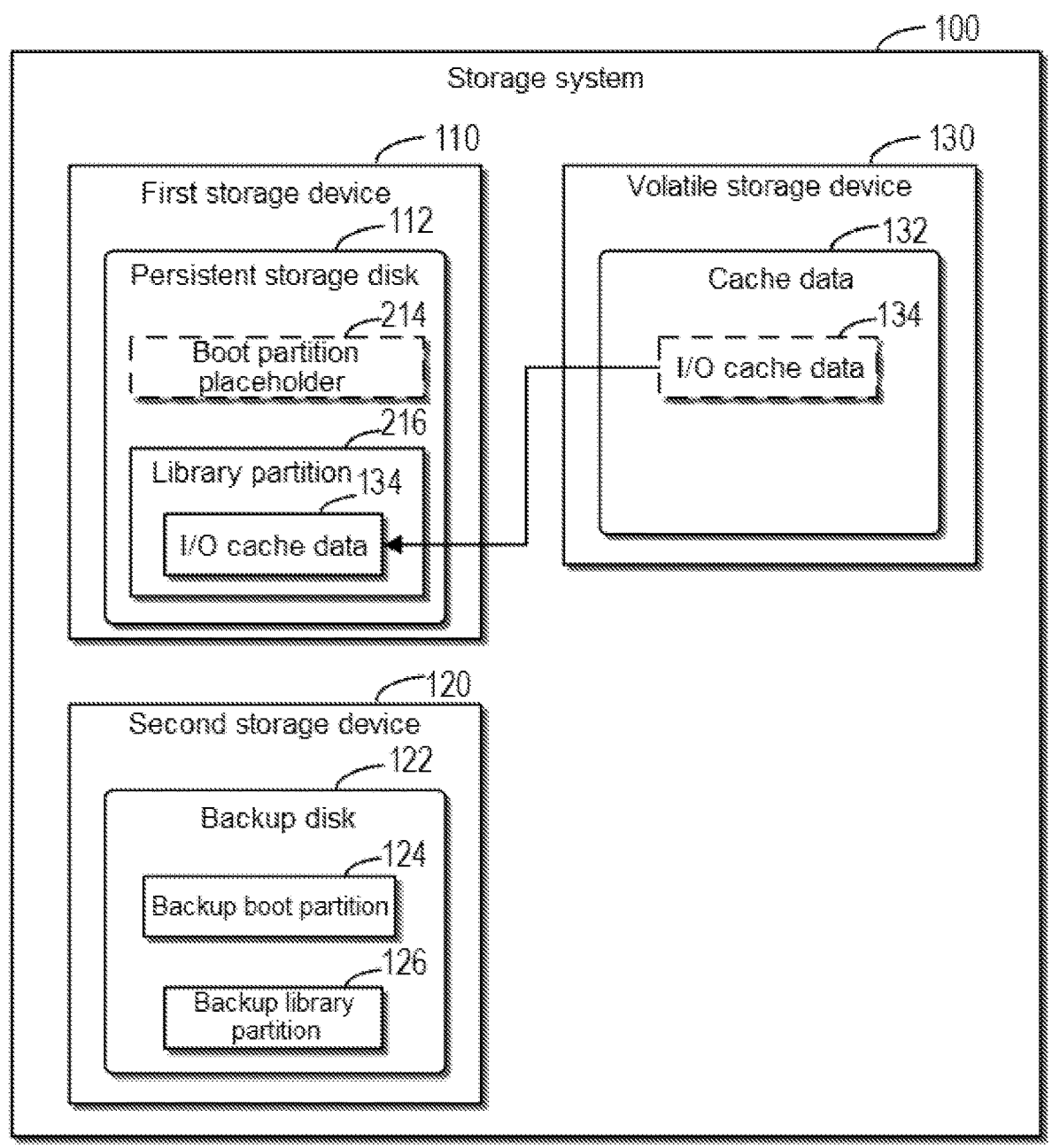
FIG. 2 shows a schematic diagram of a process of backing up cache data according to some embodiments of the present disclosure.

FIG. 2 shows schematic diagram 200 of backing up cache data according to some embodiments of the present disclosure. As described above, when the main power supply is disconnected, battery-powered storage system 100 can restart and recover at least part of data in volatile storage device 130. In order to protect these recovered data, it is necessary to back up these data from the volatile storage device into the non-volatile storage device in a timely manner. According to the solution for managing storage system 100 of the present application, storage system 100 cleans up persistent storage disk 112 in a backup mode. In some embodiments, the backup mode may refer to a mode in which it is powered by a limited capacity power supply pre-stored in storage system 100 itself. For example, the backup mode may refer to a low power mode powered by a battery. For example, after battery-powered storage system 100 is restarted, the recovered data may include process data for managing storage system 100. These processes may include a monitoring process for monitoring the power mode, a purge process for cleaning up persistent storage disk 112, a PMP process for performing PMP, and so on. In the case of battery power supply, the monitoring process can be executed to monitor that storage system 100 is in a battery-powered low power mode. Additionally or alternatively, the backup mode may also be a mode to be turned on as designated by a user. For example, the user can turn on the backup mode as required. In this case, I/O cache data 134 to be backed up may be data that the user needs to back up according to his/her needs, and not necessarily data that is recovered after a power failure.

In the backup mode, storage system 100 cleans up persistent storage disk 112 to increase the writing rate of persistent storage disk 112. The cleaning operation may refer to erasing user data on persistent storage disk 112 and recovering it to the factory state. For example, the cleaned persistent storage disk 112 no longer includes original boot partition 114 and other partitions 116. In some embodiments, persistent storage disk 112 may be cleaned up via a namespace formatting operation. In some embodiments, the operation of cleaning up persistent storage disk 112 may be performed by the purge process. It should be understood that compared with persistent storage disk 112 to which user data has been written, the cleaned persistent storage disk 112 may have a higher writing rate. Therefore, by the cleaning operation, I/O cache data 134 can be backed up from volatile storage device 130 to persistent storage disk 112 in a shorter time. For the case where storage system 100 is powered by a battery, since the battery can only support a short backup operation, this method can better realize PMP.

As described above, the cleaned persistent storage disk 112 no longer includes original boot partition 114 and other partitions 116. Therefore, the disk space of persistent storage disk 112 can be repartitioned. In some implementations, storage system 100 can use the PMP process to create library partition 216 in persistent storage disk 112 for backing up I/O cache data 134 in volatile storage device 130. Library partition 216 may be a partition dedicated to storing I/O cache data 134 to be backed up. In some embodiments, boot partition placeholder 214 may be created in the cleaned persistent storage disk 112, and boot partition placeholder 214 and library partition 216 may occupy different disk spaces. Boot partition placeholder 214 may correspond to boot partition 114 in persistent storage disk 112 for subsequent recovery of boot partition 114. In this way, the operation of storing I/O cache data 134 in library partition 216 will not affect the recovery of boot partition 114, and in turn will not affect the recovery of the original partition of persistent storage disk 112.

Based on the created library partition 216, storage system 100 writes the cache data to be backed up in volatile storage device 130 into library partition 216. In some implementations, storage system 100 may use the PMP process to write I/O cache data 134 into the created library partition 216. Since persistent storage disk 112 is non-volatile, I/O cache data 134 stored in persistent storage disk 112 will not be lost even when the battery is exhausted. In this way, an effective PMP can be realized.

The process of backing up I/O cache data 134 in volatile storage device 130 to non-volatile first storage device 110 is described above with reference to FIG. 2. The process of recovering I/O cache data 134 to volatile storage device 130 will be described below with reference to FIG. 3 and FIG. 4.

Figure 3:
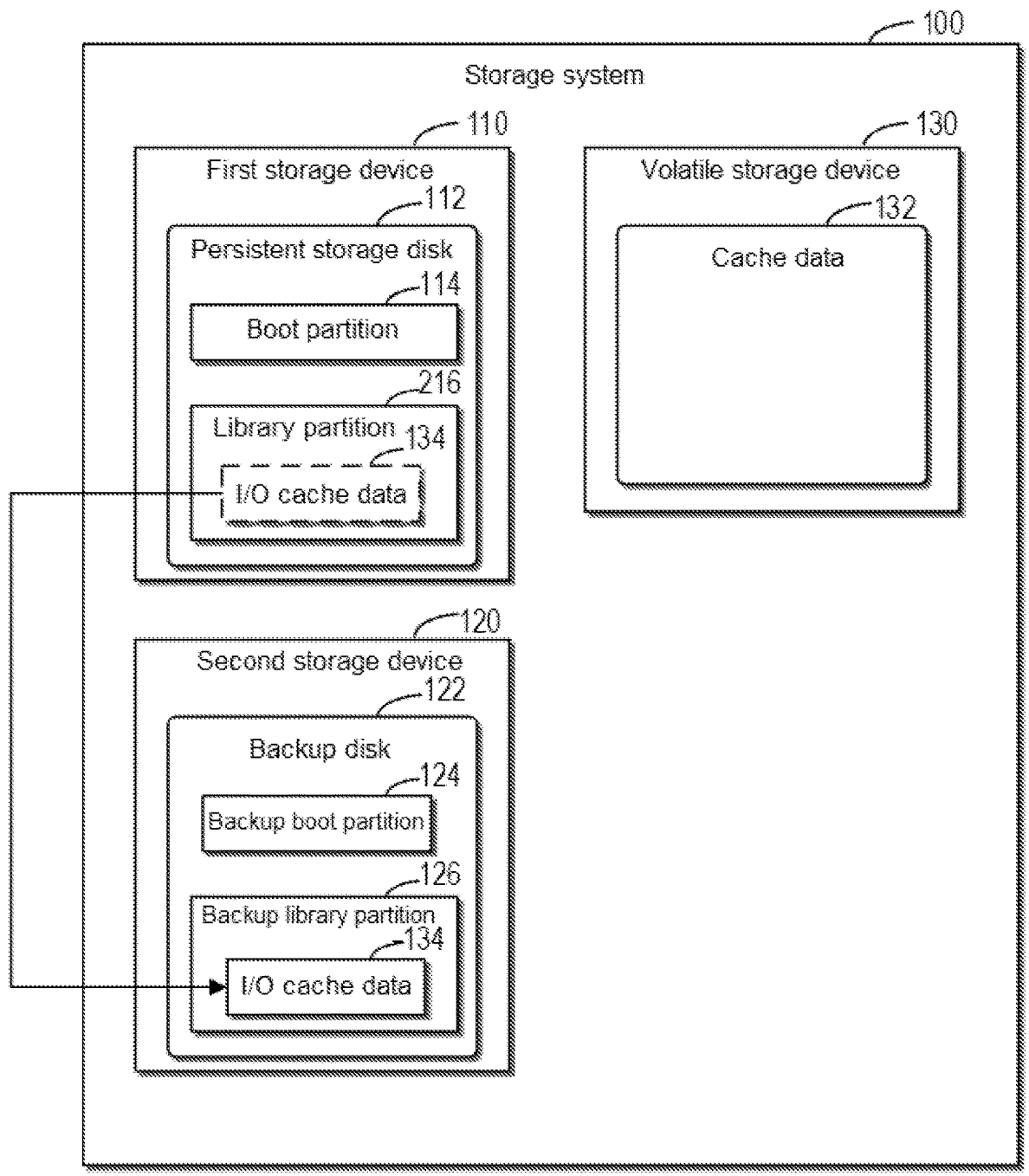
FIG. 3 shows a schematic diagram of a first process of recovering cache data according to some embodiments of the present disclosure.

FIG. 3 shows schematic diagram 300 of a first process of recovering cache data according to some embodiments of the present disclosure. In a recovery mode, storage system 100 can recover persistent storage disk 112 based on backup data about persistent storage disk 112 in backup disk 122. As shown in FIG. 3, backup disk 122 may be located in second storage device 120 and located in a different storage device from persistent storage disk 112. The recovery mode may refer to a main power mode powered by mains power. For example, when the power supply is recovered, storage system 100 can be restarted and the monitoring process can monitor that storage system 100 is in the main power mode. Additionally or alternatively, the recovery mode may also be a mode to be turned on as designated by a user. For example, the user can turn on the recovery mode as required.

In the recovery mode, storage system 100 can recover boot partition 114 at boot partition placeholder 214 based on backup data related to boot partition 114 in a first partition of backup disk 122. The first partition of backup disk 122 may be backup boot partition 124 as shown in FIG. 3. As described above, backup boot partition 124 can store all data of boot partition 114, including mirror data of a boot system in boot partition 114. In some embodiments, in the recovery mode, storage system 100 may use a Basic Input Output System (BIOS) to recover boot partition 114 based on backup boot partition 124. The BIOS can recover the mirror data of the boot system from backup boot partition 124 to boot partition 114 for executing, for example, a monitoring process, a PMP process, and the like.

Using the boot system in the recovered boot partition 114, storage system 100 can recover I/O cache data 134 from library partition 216 to volatile storage device 130. In some embodiments, storage system 100 can use the boot system to directly store I/O cache data 134 in volatile storage device 130. In some embodiments, storage system 100 may first store I/O cache data 134 from library partition 216 to a second partition of backup disk 122. The second partition may be backup library partition 126 as shown in FIG. 3.

As described above, backup library partition 126 can be used to store I/O cache data 134 in library partition 216. Since second storage device 120 is a non-volatile storage device, cache data 134 will not be lost even if the main power supply is disconnected again. In addition, since I/O cache data 134 is removed from library partition 216, a disk space occupied by library partition 216 in persistent storage disk 112 can be released. In other words, when I/O cache data 134 is stored in backup library partition 126, storage system 100 can repartition the released disk space in persistent storage disk 112 for subsequent recovery of other partitions 116 of persistent storage disk 112.

Figure 4:
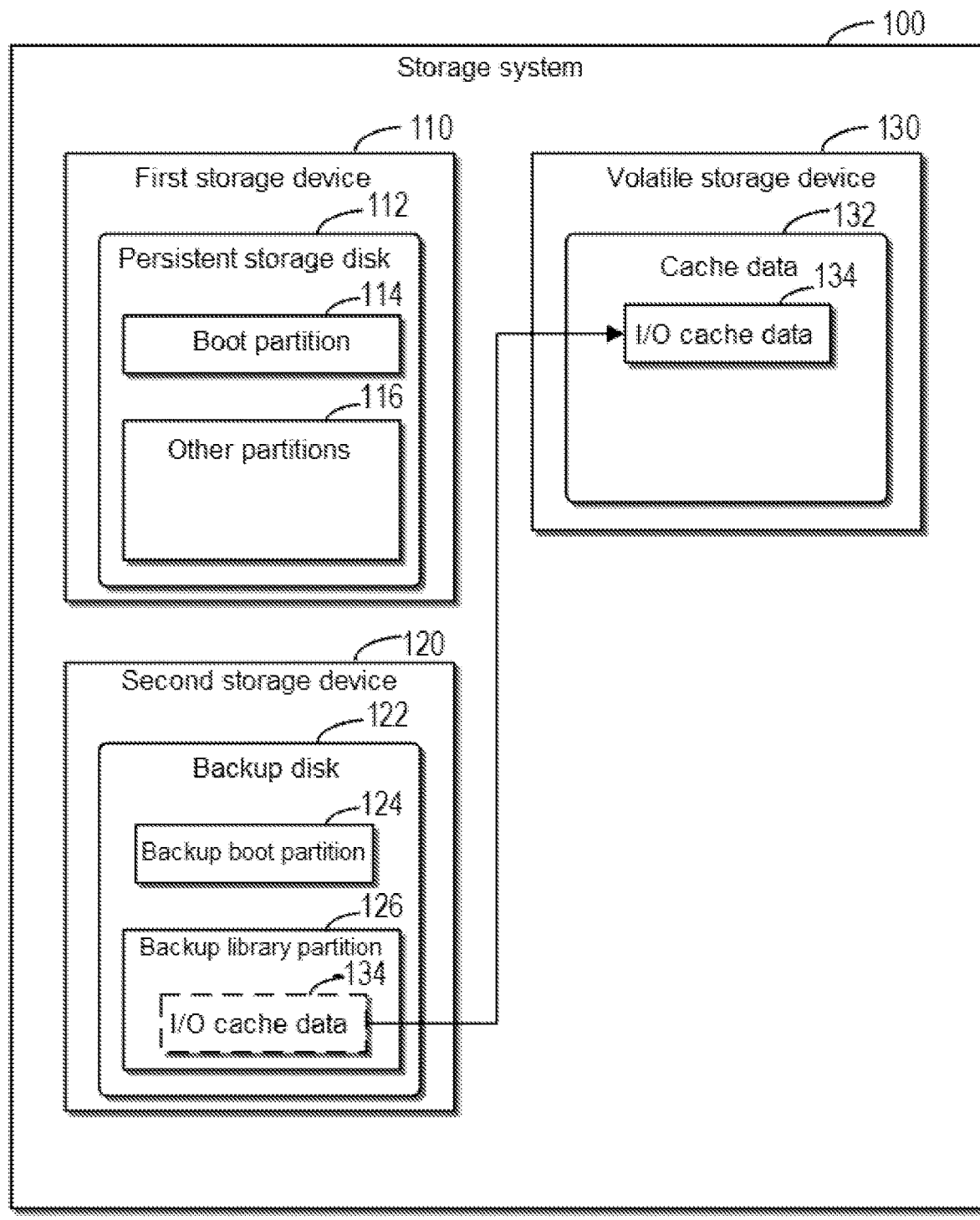
FIG. 4 shows a schematic diagram of a second process of recovering cache data according to some embodiments of the present disclosure.

FIG. 4 shows schematic diagram 400 of a second process of recovering cache data according to some embodiments of the present disclosure. After the disk space occupied by library partition 126 is released, storage system 100 may recover other partitions 116 in the cleaned persistent storage disk 112 based on backup data related to other partitions 116 in the first partition of backup disk 122. The first partition of backup disk 122 may be backup boot partition 124. In addition to the backup data related to boot partition 114, backup boot partition 124 may also include the backup data related to other partitions 116. Therefore, storage system 100 can use the boot system to recover other partitions 116 in persistent storage disk 112. In this way, in the recovery mode, the cleaned persistent storage disk 112 can be recovered to the state before cleaning for storing user data in the normal mode.

In the recovery mode, storage system 100 can also store cache data 134 from backup library partition 126 of backup disk 122 to volatile storage device 130. Storage system 100 can use the PMP process in the boot system to recover cache data 134 to volatile storage device 130. In this way, in the recovery mode, I/O cache data 134 in volatile storage device 130 can be recovered for subsequent execution.

Figure 5:
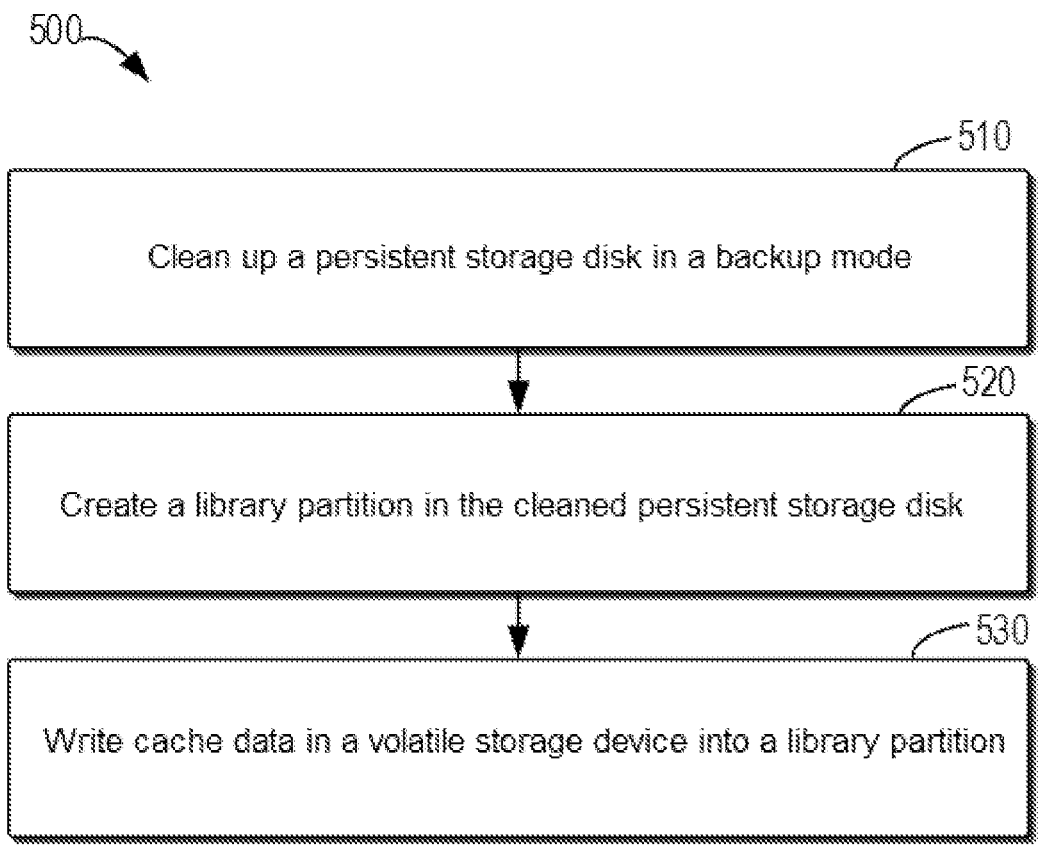
FIG. 5 shows a flow chart of managing a storage system according to some embodiments of the present disclosure.

FIG. 5 shows a flow chart of example method 500 for managing a data system according to an embodiment of the present disclosure. Method 500 may be, for example, implemented in storage system 100 as shown in FIG. 1. It should be understood that method 500 may also include additional actions not shown and/or omit actions shown, and the scope of the present disclosure is not limited in this regard. Method 500 is described below with reference to FIGS. 1-4.

At block 510, persistent storage disk 112 is cleaned up in a backup mode to increase the writing rate of persistent storage disk 112. In some embodiments, the backup mode may be a low power mode powered by a battery. In some embodiments, persistent storage disk 112 may be cleaned up via a namespace formatting operation.

At block 520, library partition 216 is created in the cleaned persistent storage disk 112. In some embodiments, boot partition placeholder 214 may be created in the cleaned persistent storage disk 112. Boot partition placeholder 214 and library partition 216 occupy different disk spaces for subsequent recovery of boot partition 114 of persistent storage disk 112.

At block 530, cache data in volatile storage device 130 is written into library partition 216. In some embodiments, the cache data may include I/O cache data. Storage system 100 may store I/O cache data 134 to be backed up from volatile storage device 130 to library partition 216.

In some embodiments, in the recovery mode, storage system 100 can also recover boot partition 114 at boot partition placeholder 214 based on backup data related to boot partition 114 in the first partition of backup disk 112. The first partition of backup disk 112 may be backup boot partition 124. Backup disk 122 and persistent storage disk 112 are located in different storage devices. In some embodiments, the recovery mode may be a main power mode powered by mains power.

In some embodiments, storage system 100 may use the boot system in the recovered boot partition 114 to recover I/O cache data 134 from library partition 216 to volatile storage device 130. In some embodiments, storage system 100 may store I/O cache data 134 from library partition 216 to the second partition of backup disk 122, e.g., backup library partition 126. Storage system 100 may also store I/O cache data 134 from the second partition of backup disk 122 to volatile storage device 130.

In some embodiments, storage system 100 may also recover other partitions 116 in the cleaned persistent storage disk 112 based on backup data related to other partitions 116 in persistent storage disk 112 than boot partition 114 in the first partition of backup disk 122.

Using the above-mentioned method 500 and in storage device 110 with only a single persistent storage disk 112, storage system 100 can write the data in volatile storage device 130 into persistent storage disk 112 at a relatively high writing rate, thereby realizing efficient PMP. In addition, storage system 100 can recover the persistent storage disk to a normal use state in the recovery mode for storing user data.

Figure 6:
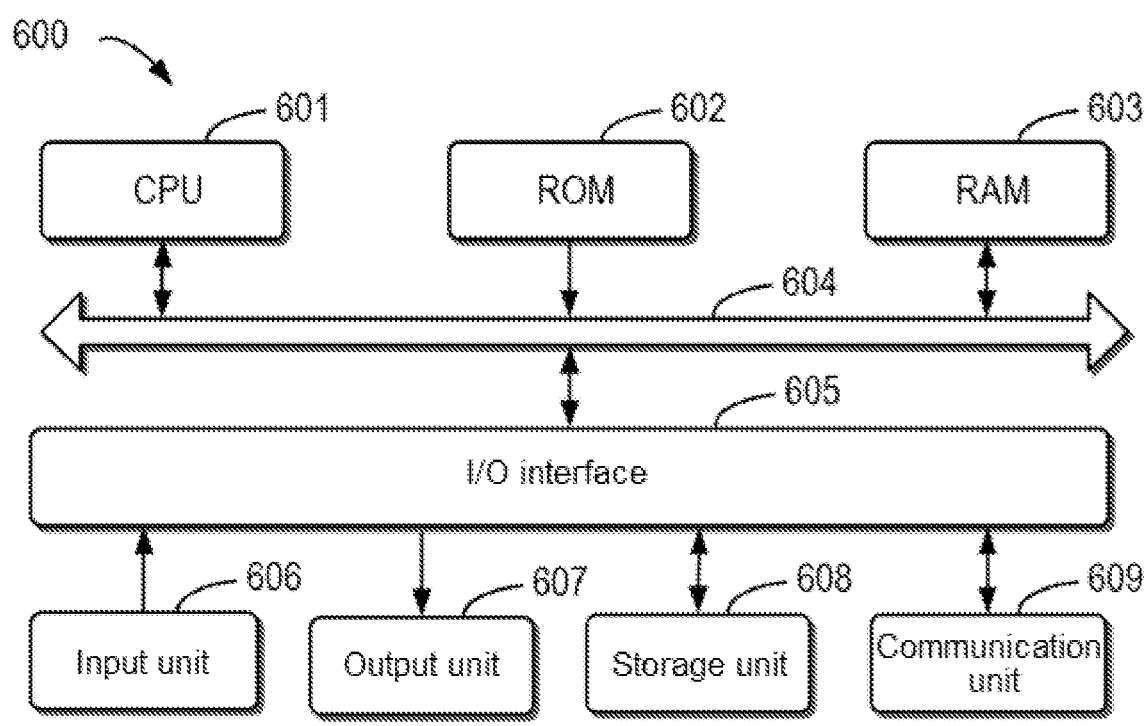
FIG. 6 shows a block diagram of an example computing device that can be used to implement the embodiments of the present disclosure.

FIG. 6 shows a schematic block diagram of example device 600 that can be used to implement the embodiments of the content of the present disclosure. For example, device 600 may be implemented at storage system 100 as shown in FIG. 1. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

Multiple components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices over a computer network such as an Internet and/or various telecommunication networks.

The various processes and processing described above, such as method 200, may be executed by processing unit 601. For example, in some embodiments, method 200 may be implemented as a computer software program that is tangibly included in a machine-readable medium, such as storage unit 608. In some embodiments, part or all of the computer program may be loaded and/or installed onto device 600 via ROM 602 and/or communication unit 609. When the computer program is loaded to RAM 603 and executed by CPU 601, one or more actions of method 200 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a SRAM, a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages, the programming languages including an object oriented programming language, such as Smalltalk, C++, and the like, and a conventional procedural programming language, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or the improvements to technologies on the market, or to enable other persons of ordinary skill in the art to understand the embodiments disclosed herein.

The invention claimed is:

1. A method for managing a storage system, comprising:
cleaning up a persistent storage disk in a backup mode to increase a writing rate of the persistent storage disk;
creating a library partition in the cleaned persistent storage disk; and
writing cache data in a volatile storage device into the library partition.

2. The method according to claim 1, wherein creating a library partition comprises:
creating a boot partition placeholder in the cleaned persistent storage disk, the boot partition placeholder and the library partition occupying different disk spaces for recovery of a boot partition of the persistent storage disk.

3. The method according to claim 2, further comprising:
in a recovery mode, recovering the boot partition at the boot partition placeholder based on backup data related to the boot partition in a first partition of a backup disk, the backup disk and the persistent storage disk being located at different storage devices;
recovering the cache data from the library partition to the volatile storage device by using a boot system in the recovered boot partition; and
based on backup data related to other partitions in the persistent storage disk than the boot partition in a first partition of the backup disk, recovering the other partitions in the cleaned persistent storage disk.

4. The method according to claim 3, wherein recovering the cache data from the library partition to the volatile storage device comprises:
storing the cache data from the library partition to a second partition of the backup disk; and
storing the cache data from the second partition of the backup disk to the volatile storage device.

5. The method according to claim 3, wherein the recovery mode is a main power mode powered by mains power.

6. The method according to claim 1, wherein the backup mode is a low power mode powered by a battery.

7. The method according to claim 1, wherein the cache data comprises I/O cache data.

8. An electronic device, comprising:
a processor; and
a memory coupled to the processor, the memory having instructions stored therein, and the instructions, when executed by the processor, causing the device to execute actions comprising:
cleaning up a persistent storage disk in a backup mode to increase a writing rate of the persistent storage disk;
creating a library partition in the cleaned persistent storage disk; and
writing cache data in a volatile storage device into the library partition.

9. The device according to claim 8, wherein creating a library partition comprises:
creating a boot partition placeholder in the cleaned persistent storage disk, the boot partition placeholder and the library partition occupying different disk spaces for recovery of a boot partition of the persistent storage disk.

10. The device according to claim 8, wherein the actions further comprise:
in a recovery mode, recovering the boot partition at the boot partition placeholder based on backup data related to the boot partition in a first partition of a backup disk, the backup disk and the persistent storage disk being located at different storage devices;
recovering the cache data from the library partition to the volatile storage device by using a boot system in the recovered boot partition; and
based on backup data related to other partitions in the persistent storage disk than the boot partition in a first partition of the backup disk, recovering the other partitions in the cleaned persistent storage disk.

11. The device according to claim 10, wherein recovering the cache data from the library partition to the volatile storage device comprises:
storing the cache data from the library partition to a second partition of the backup disk; and
storing the cache data from the second partition of the backup disk to the volatile storage device.

12. The device according to claim 10, wherein the recovery mode is a main power mode powered by mains power.

13. The device according to claim 8, wherein the backup mode is a low power mode powered by a battery.

14. The device according to claim 8, wherein the cache data comprises I/O cache data.

15. A computer program product having a non-transitory computer readable medium which stores a set of instructions to manage a storage system; the set of instructions, when carried out by computerized circuitry, causing the computerized circuitry to perform a method of:
cleaning up a persistent storage disk in a backup mode to increase a writing rate of the persistent storage disk;
creating a library partition in the cleaned persistent storage disk; and
writing cache data in a volatile storage device into the library partition.

* * * * *